(12) United States Patent
Seeger et al.

(10) Patent No.: US 11,255,444 B2
(45) Date of Patent: Feb. 22, 2022

(54) SEAL ASSEMBLY AND FLUID REGULATING VALVE

(71) Applicant: Vitesco Technologies GmbH, Hannover (DE)

(72) Inventors: Armin Seeger, Schwalbach a. Ts. (DE);
Chunxiao Yan, Schwalbach a Ts. (DE);
Jörg Eissler, Schwalbach a Ts. (DE);
Klaus-Jürgen Lienig, Schwalbach a Ts. (DE); Monika Ruhstorfer, Schwalbach a Ts. (DE); Prashant Chavan, Schwalbach a Ts. (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/978,604

(22) PCT Filed: Mar. 6, 2019

(86) PCT No.: PCT/EP2019/055591
§ 371 (c)(1),
(2) Date: Sep. 4, 2020

(87) PCT Pub. No.: WO2019/170761
PCT Pub. Date: Sep. 12, 2019

(65) Prior Publication Data
US 2021/0033200 A1    Feb. 4, 2021

(30) Foreign Application Priority Data
Mar. 7, 2018 (DE) ...................... 10 2018 203 450.8

(51) Int. Cl.
*F16K 5/04*    (2006.01)
*F16K 11/085*  (2006.01)
*B60R 16/08*   (2006.01)

(52) U.S. Cl.
CPC ........ *F16K 5/0471* (2013.01); *F16K 11/0853* (2013.01); *B60R 16/08* (2013.01)

(58) Field of Classification Search
CPC .. F16K 11/0853; F16K 5/0678; F16K 5/0689; F16K 5/0271; F16K 5/0471
See application file for complete search history.

(56) References Cited

U.S. PATENT DOCUMENTS 9,518,446 B2 * 12/2016 Reid ....................... E21B 43/16

FOREIGN PATENT DOCUMENTS

CN    102449357    5/2012
CN    104685275    6/2015
(Continued)

OTHER PUBLICATIONS

Machine Translation of DE102009014047, retrieved Apr. 23, 2021 (Year: 2010).*
(Continued)

*Primary Examiner* — Michael R Reid
(74) *Attorney, Agent, or Firm* — Cozen O'Connor

(57) ABSTRACT

A seal arrangement for use in a fluid control valve includes: a first seal configured to sealingly abut against an actuatable valve body of the fluid control valve; a second seal configured to sealingly abut against a valve housing of the fluid control valve; and an elastically deformable intermediate spacer, arranged between the first seal and the second seal and configured to elastically space the first and second seals apart. At least in an installed state of the seal arrangement in the fluid control valve, the first seal and the second seal are joined to one another in positively locking fashion in an axial direction of the seal arrangement.

8 Claims, 3 Drawing Sheets

(56) References Cited

FOREIGN PATENT DOCUMENTS

| | | |
|---|---|---|
| CN | 106164548 | 11/2016 |
| CN | 107614949 | 1/2018 |
| DE | 10 2009 014 047 | 9/2010 |
| DE | 10 2015 216 498 | 3/2016 |
| DE | 20 2017 000 564 | 3/2017 |
| WO | WO 2016/030505 | 3/2016 |

OTHER PUBLICATIONS

Office Action dated Sep. 3, 2021 issued in Chinese Patent Application No. 201980016757.0.

* cited by examiner

SEAL ASSEMBLY AND FLUID REGULATING VALVE

CROSS REFERENCE TO RELATED APPLICATIONS

This is a U.S. national stage of International application No. PCT/EP2019/055591, filed on Mar. 6, 2019, which claims priority to German Application No. 10 2018 203 450.8, filed Mar. 7, 2018, the content of each of which is incorporated herein by reference.

BACKGROUND OF THE INVENTION

1. Field of the Invention

The present invention relates to a seal arrangement and to a fluid control valve. A fluid control valve is to be understood as meaning in particular a cooling water control valve for use in a vehicle. A vehicle is to be understood as meaning any type of vehicle which has to be supplied with a liquid and/or gaseous fuel for operation, but in particular passenger vehicles and/or utility vehicles. Furthermore, the vehicle may also be a partially electric or fully electric vehicle.

2. Description of the Prior Art

Seals as such can have different roles. They can, for example, serve to prevent or at least to limit undesired fluid losses. A fluid can be understood as meaning a liquid and/or gaseous medium.

SUMMARY OF THE INVENTION

An object of the present invention is to provide a seal arrangement for use in a fluid control valve, in particular in the form of a cooling water control valve, the seal arrangement complying with the highest demands placed on long-term leak-tightness under known large temperature fluctuations of a combustion engine periphery and/or an electric motor periphery. It is furthermore the intention for the seal arrangement to be producible inexpensively and to permit tolerance compensation over a broad tolerance range.

According to one aspect of the present invention, a seal arrangement for use in a fluid control valve of a vehicle comprises a first, separate seal for sealing abutment against an actuatable valve body of the fluid control valve, a second, separate seal for sealing abutment against a valve housing of the fluid control valve, and a separate, elastically deformable intermediate piece, which is arranged between the first seal and the second seal and which serves for elastically spacing the two seals apart in an axial direction of the seal arrangement. Here, at least in an installed state of the seal arrangement in the fluid control valve, the first seal and the second seal are joined to one another in positively locking fashion in the axial direction of the seal arrangement.

The positively locking joining positions the two seals relative to one another, such that the two seals can be supported against one another.

In one aspect, the first seal and the second seal are joined to one another in positively locking fashion already in an assembled state of the seal arrangement, that is to say after the seal arrangement has been assembled and before the seal arrangement is installed into the fluid control valve. This facilitates both the assembly process and the installation of the seal arrangement.

In another aspect, on two mutually oppositely situated end sides of the two seals, there is formed in each case one encircling projection, wherein the mutually oppositely situated projections engage into one another in positively locking fashion, by at least partially overlapping one another in the axial direction, either already in an assembled state of the seal arrangement—that is to say after the seal arrangement has been assembled and before the seal arrangement is installed into the fluid control valve—or for the first time as a result of the compression of the intermediate piece in an installed state of the seal arrangement in the fluid control valve.

Here, the two encircling projections are arranged or integrally formed on the respective end side of the seal radially at the inside with respect to a seal opening, such that the intermediate piece sealingly encloses the two projections.

Also proposed is a fluid control valve having at least one seal arrangement of the above-described type for sealing off a connection region of the fluid control valve, in particular in the form of a multi-way control valve.

Also proposed is the use of such a fluid control valve as a cooling water control valve.

BRIEF DESCRIPTION OF THE DRAWINGS

The invention will be explained in detail in the following text with reference to the illustrations in the figures. Further advantageous refinements of the invention are apparent from the dependent claims and the description below of preferred embodiments. For this purpose:

DETAILED DESCRIPTION OF THE PRESENTLY PREFERRED EMBODIMENTS

Identical features or features having an identical effect are denoted by the same reference designations throughout the figures.

Figure 1:
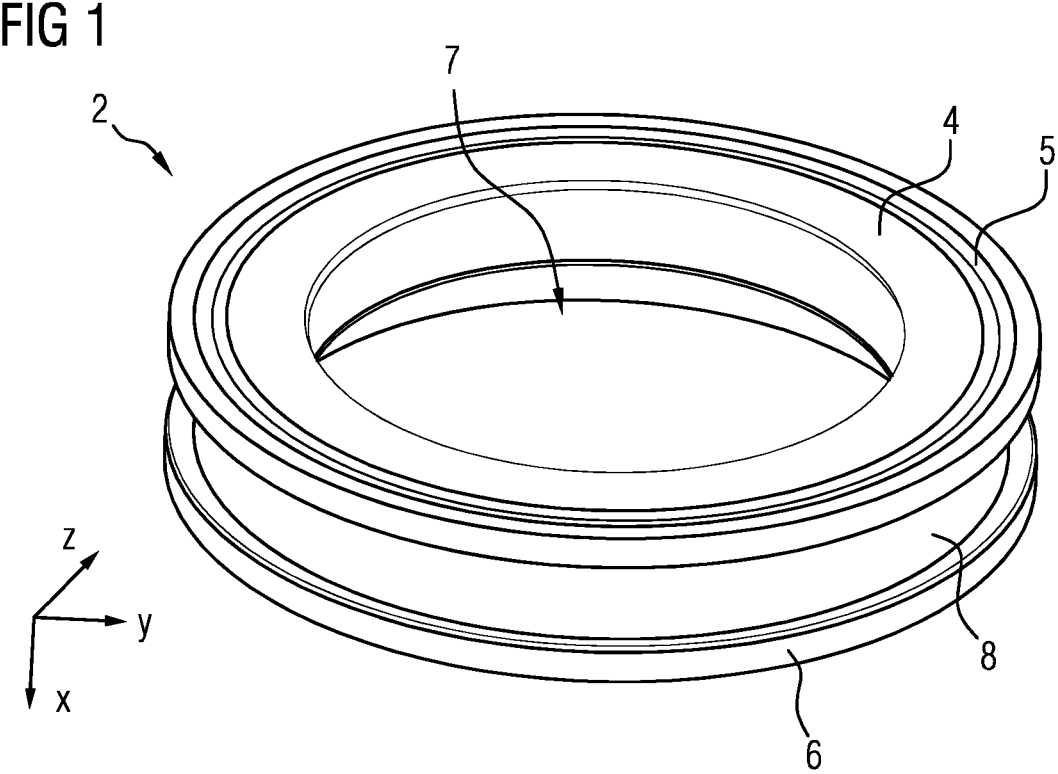
FIG. 1 shows an embodiment of a proposed seal arrangement.
Figure 2:
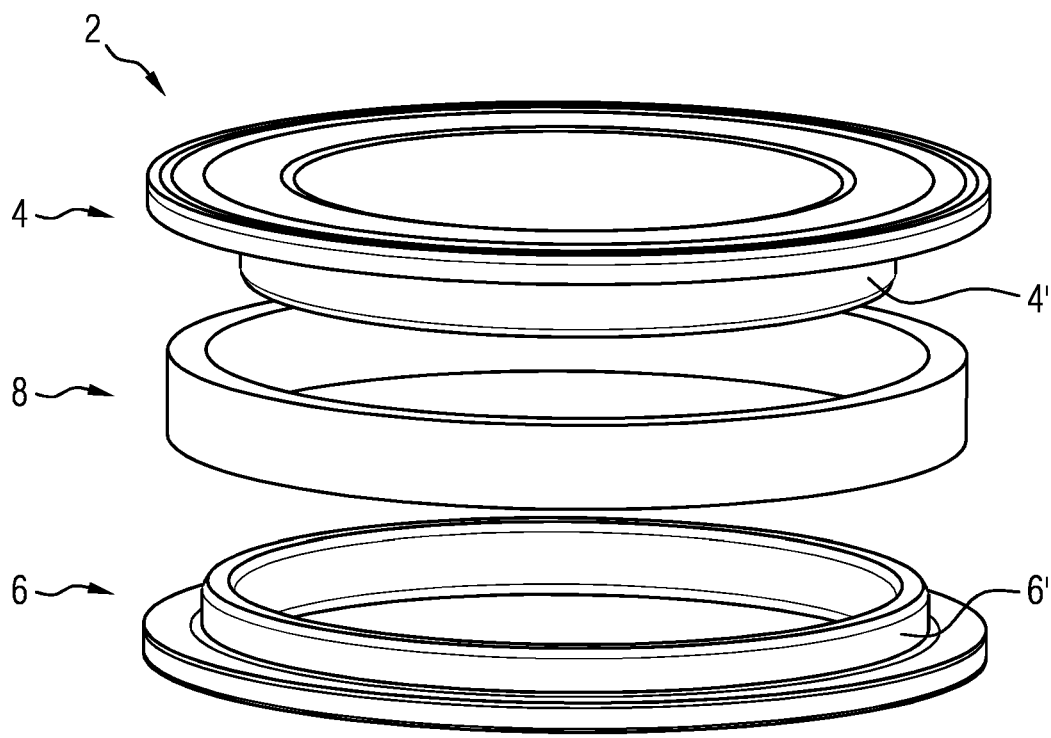
FIG. 2 shows the seal arrangement shown in FIG. 1 in an exploded illustration.

The circular-ring-shaped seal arrangement 2 or multi-part seal 2 shown in FIG. 1 comprises a first seal 4, a second seal 6 and an interposed, elastically deformable and closed encircling intermediate piece 8, which elastically spaces the two seals 4 and 6 apart in an axial direction of the seal arrangement (X axis). Here, on two mutually oppositely situated end sides of the two seals 4 and 6 (see for example FIG. 3), there is formed in each case one encircling projection 4', 6'. Here, the intermediate piece 8 has been pulled onto the second seal 6 so as to bear at the outside against the projection 6' and against the end side of the seal 6 (see for example FIG. 3). The two projections 4', 6' are in this case oriented so as to be offset with respect to one another in a radial direction such that, in an assembled state (illustrated by FIG. 3)—that is to say after the seal arrangement 2 has been assembled—the projections already engage into one another in positive locking fashion by partially overlapping one another in the axial direction. Here, the first seal 4 slides under the second seal 6. In contrast, FIG. 4 illustrates the seal arrangement 2 in an installed state, for example in a cooling water control valve, in which the intermediate piece 8 has been compressed.

Figure 3:
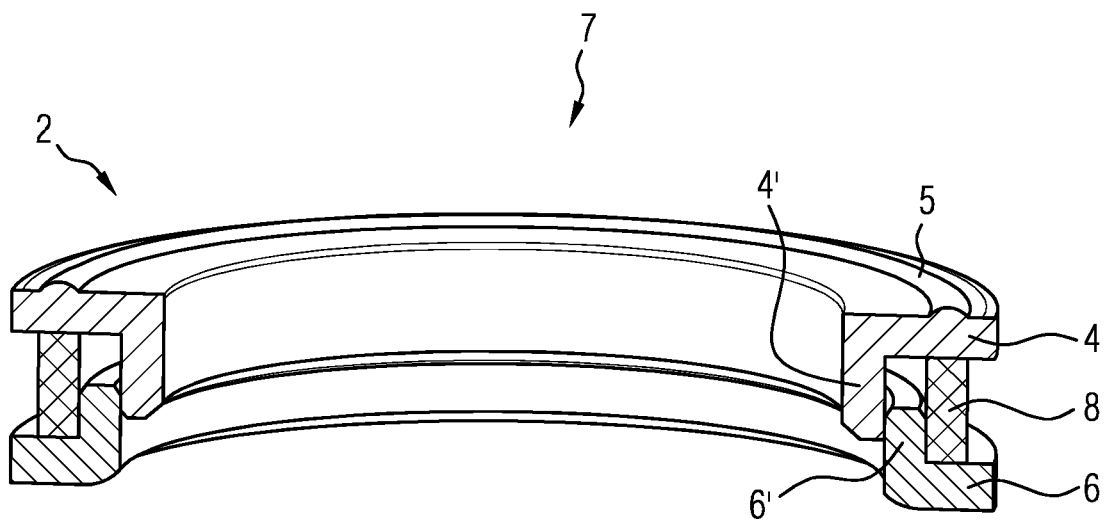
FIG. 3 shows the seal arrangement shown in FIG. 1 in a cross-sectional illustration and in an assembled state.
Figure 4:
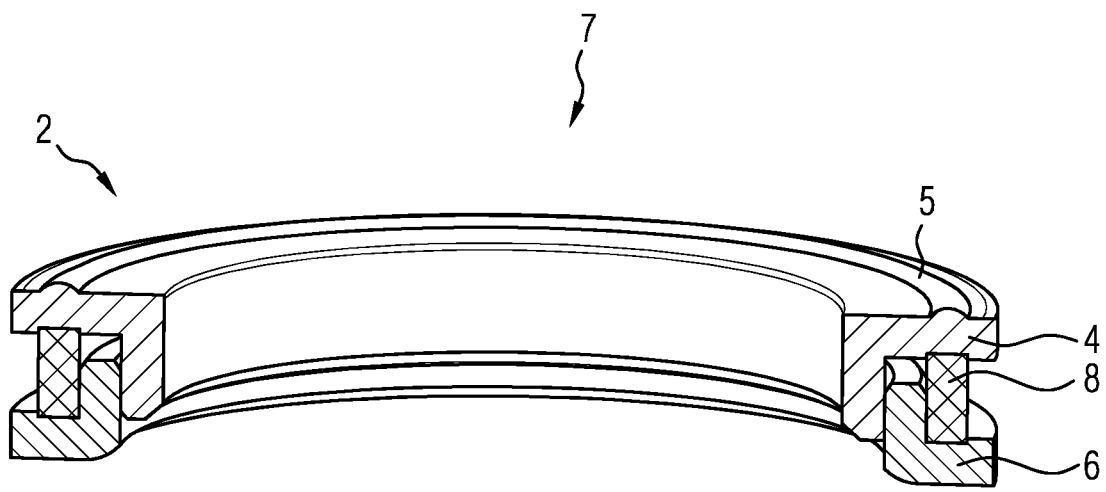
FIG. 4 shows the seal arrangement shown in FIG. 1 in a cross-sectional illustration and in an installed state.

FIG. 3 illustrates, for example, that the two projections 4', 6' are arranged or integrally formed on the respective end side of the seal 4, 6 radially at the inside with respect to a seal opening 7 (See FIG. 1), such that the intermediate piece 8 sealingly encloses the overlap, situated at the inside in relation thereto, of the two projections 4', 6'.

The intermediate piece 8 illustrated in the figures (FIG. 1 to FIG. 4) may, for example, have, on the outside, an encircling, hydraulically force-boosting groove, for example in the form of a V-shaped groove (not illustrated). The intermediate piece may basically be configured freely with regard to its shaping, that is to say that, instead of the circular-ring-shaped or ring-shaped form illustrated in the figures, a substantially circular-ring-shaped or ring-shaped form of the intermediate piece 8 is also conceivable. Here, the intermediate piece 8 is expediently arranged and configured so as to describe a desired advantageous force-travel characteristic curve in the sense of a system characteristic. Such an advantageous force-travel characteristic curve is to be understood for example as meaning a characteristic curve in the case of which the force applied to the intermediate piece 8 increases only slightly within certain limits with increasing deformation travel of the intermediate piece 8, wherein the increase may be of progressive, linear and/or degressive form.

Here, all of the embodiments described above have in common the fact that, at least on the seal 4, which is provided for statically sealing abutment against an actuatable valve body 28 of a fluid control valve 22 (See e.g., FIG. 5), an encircling projecting bead 5 may expediently be integrally formed on the sealing-surface side (see e.g., FIG. 3 and FIG. 4), which bead gives rise to a linear and/or areal sealing action. Here, the bead 5 may be integrally formed, at the outside with respect to the seal opening 7, on that end surface of the seal 4 that faces toward the valve body surface. Such a bead 5 may basically analogously also be provided on the seal 6, which is provided for dynamically sealing abutment against a valve housing 26 of the fluid control valve 22 (see e.g., FIG. 5).

Furthermore, all of the embodiments described above have in common the fact that at least the first seal 4 is formed as a hard seal. It is however preferable for the second seal 6 to also be formed as a hard seal. Here, such a hard seal is to be understood as meaning a seal which, in contrast to the intermediate piece 8, is elastically non-deformable at least at the sealing contact point—whether this has a linear and/or areal sealing action. Basically, the hard seal may for example also be manufactured, for example by injection molding, entirely from PTFE (polytetrafluoroethylene) and/or the like. As an alternative to this, it would also be possible for the hard seal to be formed from a plastic that has a correspondingly hard coating, for example of PTFE and/or the like, at the sealing side. To save costs, it would also be possible for the second seal 6 to be formed merely from a plastic that is softer and less expensive in relation to that of the first seal 4.

In contrast, the intermediate piece 8—in the form of a closed encircling profile—is formed from an elastically deformable plastic, for example an elastomer etc., such that the axial spacing of the two seals 4 and 6 can, in accordance with a length tolerance situation to be compensated, be set by a correspondingly elastic deformation of the intermediate piece 8. This elastic deformation furthermore gives rise to the desired bracing of the seal arrangement 2 or multi-part seal 2 in its installed state.

Two hard seals 4 and 6 per se, for example in the form of two PTFE hard seals, in conjunction with the elastomer intermediate piece 8 already form an arrangement of individual parts which can adhere well to one another, and which can be easily installed as a unit into the fluid control valve 22. Furthermore, misalignment of the elastomer intermediate piece 8 during the installation process is advantageously prevented by the two PTFE hard seals 4 and 6.

Figure 5:
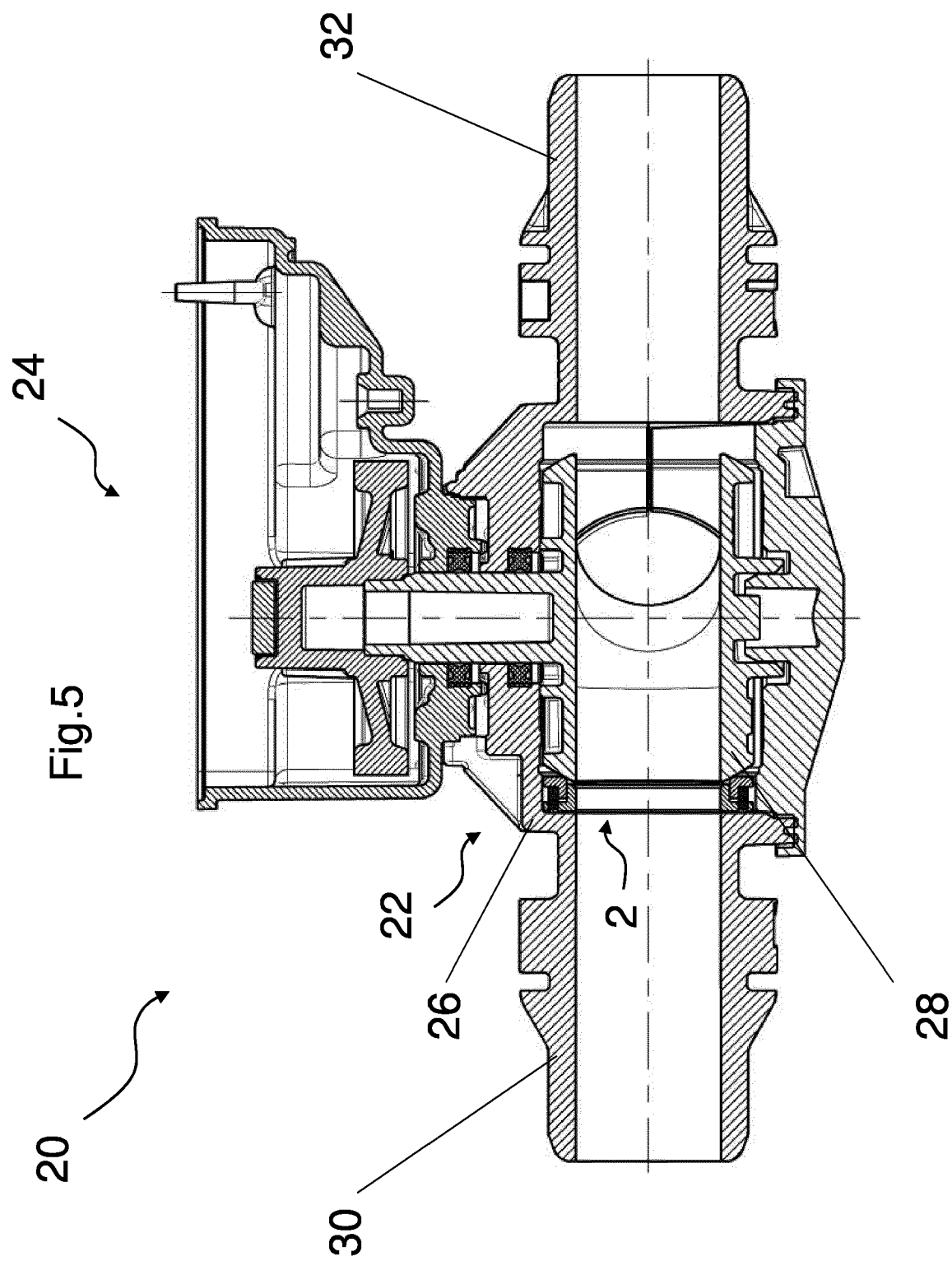
FIG. 5 shows a cooling water control valve unit.

FIG. 5 illustrates an installed state of the proposed seal arrangement 2 in a cooling water control valve 20 which, aside from a multi-way cooling water control valve 22, also has an actuator 24 for the control of the multi-way cooling water control valve 22. Here, such a seal arrangement 2 is provided between in each case one of the two illustrated valve connections 30, 32 and the valve body 28, which is actuatable pivotably by the actuator 24, wherein the first seal 4 bears with a statically sealing action against the actuatable valve body 28 and the second seal 6 bears with a dynamically sealing action against the valve housing 26. Here, for the sake of simplicity, only one seal arrangement 2 is illustrated in FIG. 5.

It is clear from the illustration in FIG. 5 that pressurized cooling water that ingresses into the intermediate space between the two seals 4 and 6 acts against the two seals 4 and 6 and thus fluidically or hydraulically boosts the sealing action thereof. This fluidic or hydraulic sealing action can be further boosted by the above-described groove encircling on the outside of the intermediate piece 8 (not illustrated), which groove, as such, has a fluidically or hydraulically force-boosting action.

The seal arrangement proposed in the context of this disclosure is firstly producible inexpensively and secondly compensates tolerances over a relatively broad length tolerance range, and does so in conjunction with a long-term sealing action. With regard to the multi-way cooling water control valve 22 (see e.g., FIG. 5) described above, it is possible by the proposed seal arrangement, depending on design, to compensate cumulative length tolerances of up to 1 mm (≤1 mm) or more (≥1 mm).

Although exemplary embodiments have been explained in the above description, it should be noted that numerous modifications are possible. Furthermore, it should be noted that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the component parts described, without departing from the scope of protection as apparent from the claims and combinations of features equivalent thereto.

The invention claimed is:

1. A seal assembly for a fluid control valve having an actuatable valve body and a valve housing, the seal assembly comprising:
    a first seal (4) configured to sealingly abut against the actuatable valve body of the fluid control valve;
    a second seal (6) configured to sealingly abut against the valve housing of the fluid control valve;
    an elastically deformable intermediate spacer (8), arranged between the first seal (4) and the second seal (6) and configured to elastically space the first and second seals (4, 6) apart;

on two mutually oppositely situated end sides of the first and second seals (4, 6), first and second encircling projections (4|, 6|), wherein the first and second projections (4|, 6|) are configured to engage into one another in a positively locking fashion, by at least partially overlapping one another in the axial direction; and a seal opening (7), wherein, at least in an assembled but uninstalled state of the seal assembly (2), the first seal (4) and the second seal (6) are joined to one another in the positively locking engagement in the axial direction of the seal assembly, and wherein the first and second projections (4|, 6|) are arranged at an inside with respect to the seal opening (7), such that the intermediate spacer (8) sealingly encloses the overlap, situated at the inside in relation thereto, of the first and second projections (4|, 6|).

2. The seal assembly as claimed in claim 1, wherein the first and second seals (4, 6) and the intermediate spacer (8) are each ring-shaped and together form the seal assembly (2) as a ring-shaped seal assembly.

3. The seal assembly as claimed in claim 1, wherein the first seal (4) and/or the second seal (6) are/is configured as a hard seal.

4. The seal assembly as claimed in claim 1, wherein the intermediate spacer (8) is made of an elastically deformable plastic.

5. A fluid control valve having at least one seal assembly (2) as claimed in claim 1 for sealing off a connection region of the fluid control valve.

6. The fluid control valve as claimed in claim 5, configured as a multi-way control valve.

7. The fluid control valve as claimed in claim 6, configured as a cooling water control valve.

8. The fluid control valve as claimed in claim 6, configured as a cooling water control valve of a vehicle.

* * * * *